United States Patent [19]

Gabas

[11] Patent Number: 5,177,643
[45] Date of Patent: Jan. 5, 1993

[54] MIRROR FOR SUN VIZOR OF MOTOR VEHICLES PROVIDED WITH A HINGED COVER

[75] Inventor: Carlos Gabas, Barcelona, Spain

[73] Assignee: Industrias Techno-Matic S.A., Barcelona, Spain

[21] Appl. No.: 689,234

[22] PCT Filed: Oct. 2, 1990

[86] PCT No.: PCT/ES90/00032

§ 371 Date: Jun. 6, 1991

§ 102(e) Date: Jun. 6, 1991

[87] PCT Pub. No.: WO91/04878

PCT Pub. Date: Apr. 18, 1991

[30] Foreign Application Priority Data

Oct. 6, 1989 [ES] Spain .................................. 8903367

[51] Int. Cl.⁵ .................................................. G02B 7/18
[52] U.S. Cl. ..................................... 359/844; 296/97.2
[58] Field of Search ................... 359/841, 844, 871; 296/97.2; 248/466, 473

[56] References Cited

U.S. PATENT DOCUMENTS

| | | | |
|---|---|---|---|
| 4,000,404 | 12/1976 | Marcus | 359/844 |
| 4,981,348 | 1/1991 | Prillard | 359/844 |
| 4,988,180 | 1/1991 | Gabas | 359/844 |
| 5,059,016 | 10/1991 | Lawassani et al. | 359/871 |

Primary Examiner—Bruce Y. Arnold
Assistant Examiner—J. P. Ryan
Attorney, Agent, or Firm—Michael J. Striker

[57] ABSTRACT

A mirror for a motor vehicle sun visor has a reflective member having a reflective surface; a frame having a frame portion for the reflective member and a U-shaped extension having inner facing surfaces and extending substantially perpendicularly to a longitudinal axis of the frame portion; a hinged cover for concealing the reflective surface of the reflective member; elements for retaining and pivoting the hinged cover provided in the U-shaped extension and including two projections extending from the inner facing surfaces, the projections having longitudinal axes aligned with one another; and other elements for coupled the hinged cover with the frame including U-shaped clamps extending substantially obliquely from the hinged cover and having an external contour corresponding to a contour of the projections, so that when the clamps and the projections engage with each other the hinged cover can pivot and occupy a plurality of positions.

15 Claims, 2 Drawing Sheets

MIRROR FOR SUN VIZOR OF MOTOR VEHICLES PROVIDED WITH A HINGED COVER

BACKGROUND

The present invention relates to a mirror for motor vehicle sun visors, provided with a hinged cover and, in particular, applicable to modular structure sun visors.

Technological improvements have been made in sun visors with which motor vehicles are equipped, particularly the passenger side sun visors with so-called vanity mirrors. The mirror is usually unit formed by a reflective surface and assembly and mounting members.

The vanity mirrors may be provided with devices directed to directional concealment of the reflective surface, in accordance with the interior of the vehicle passenger compartment, at the same time they preserve the reflective constants of the mirror surface and, therefore, the original quality of the image provided by said surface.

Some solutions are disclosed in the following Spanish Utility Models: Utility model No. 276,352, Utility model No. 276,353 and Utility model No. 276,822.

In the Utility models Nos. 276,352 and 276,353 the reflective surface concealing device is arrange on a hingedly mounted external covering flap, while in Utility model No. 276,822 said concealing device is arranged on a cover which sides in longitudinal guideways and may in turn be concealed in the sun visor structure.

This constructions disclosed in the Utility models Nos. 276,352, 276,353 and 276,822 are substantially complex to manufacture and assemble in the sun visor structures currently available on the market. This has a negative influence, raising the cost of the thus formed end product.

SUMMARY OF THE INVENTION

With a view to providing a new, economical solution to the problem raised by the concealment of the reflective surface of the so-called vanity mirror normally integrated in the structure of the passenger side sun visor, a mirror for motor vehicle sun visors is provided with a hinged cover which, is substantially different from prior art devices of this type.

The mirror for motor vehicle sun visors provided with a hinged cover according to the invention has a one-piece approximately rectangular frame with a frame provided for a reflective surface and having a U-shaped extension, and said extension has means for retaining and pivoting a hinged cover for concealing the reflective surface.

A further feature of the mirror of the invention is that the means for retaining and pivoting the hinged cover for concealing the reflective surface is formed on inner facing surfaces of the U-shaped is formed on inner facing surfaces of the U-shaped extension and includes two projections of sufficient dimensions which, respectively, extend perpendicularly to said facing surfaces. The projections have a sufficient number of planes delimiting the position of concealment of the reflective surface by said hinged cover.

Yet a further feature of the mirror of the invention is that the cover for concealing the reflective surface of the hinged mirror is an essentially rectangular one-piece member and has means for coupling said cover to the one-piece frame as well as means facilitating user operation of said cover once coupled to the one-piece frame.

The coupling means for the hinged cover to the one-piece frame is formed in the ends of one of the longer sides of said cover and includes U-shaped clamps extending substantially obliquely from the transverse axis of said cover.

The clamps, are provided with an internal contour snugly corresponding with the respective contour of the projections formed on the facing inner surfaces of the one-piece frame extension. The clamps and projections are engaged with each other, to allow the hinged frame to pivot and occupy set positions of use very a wide range.

An additional feature of the mirror of the invention is that when the one-piece frame is engaged with the cover and the latter is in the reflective surface concealing position, the joint action of the positioning planes formed on the projections of the one-piece frame extension and on the clamps of the hinged cover, prevents the cover from coming out, under normal conditions of use, position, either because of wear or because of vibrations caused by the vehicle when running.

The broad range of set positions of use defined between the position of concealment of the reflective surface of the mirror and that of use of said reflective surface.

To facilitate manipulation of the mirror cover by the user, when it is engaged with the one-piece frame, the cover is provided on the front surface thereof with an easily actuatable sufficiently dimensioned projection.

BRIEF DESCRIPTION OF THE DRAWINGS

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENT

Figure 1:
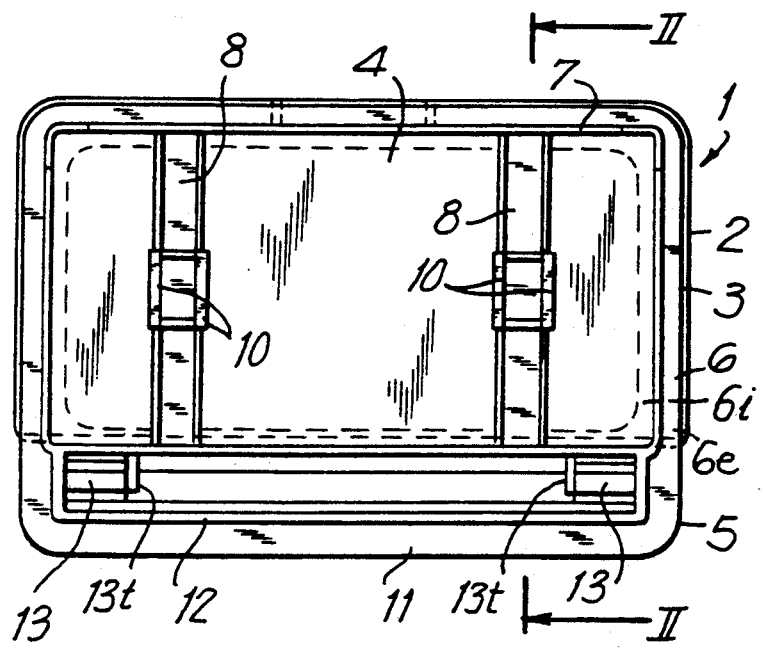
FIG. 1 is a rear view of a mirror of the invention with a one-piece frame and the hinged cover, engaged with one another.
Figure 2:
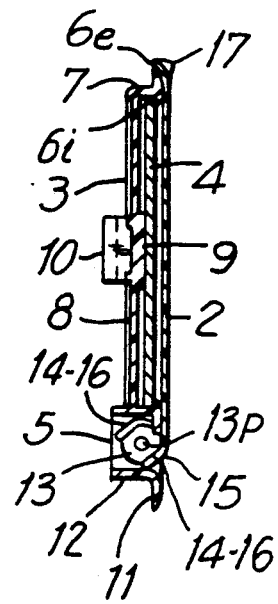
FIG. 2 is a view showing a section taken along the line II—II of FIG. 1.

A mirror for motor vehicle sun visors has, as shown in FIGS. 1 and 2 a one-piece frame 1 and a hinged cover 2, both made preferably from plastics materials of mechanical properties appropriate for each particular application.

The one-piece frame 1 which in this embodiment is approximately rectangular, has a frame 3 extending over a perimeter of a plate 4 containing the reflective surface of the mirror. The frame 1 has an extension 5 with means for retaining and pivoting cover 2 designed to conceal the hinged reflective surface as shown in detail in FIGS. 1, 2, 3 and 4.

The frame 3 is formed by a covering flap 6 covering flap has an inner flange 6a and an outer flange 6e, and also a central rib 7 which, as shown in FIGS. 1, 2, 3, 4 and 8, is perpendicular to the plane of the covering flap 6.

Figure 3:
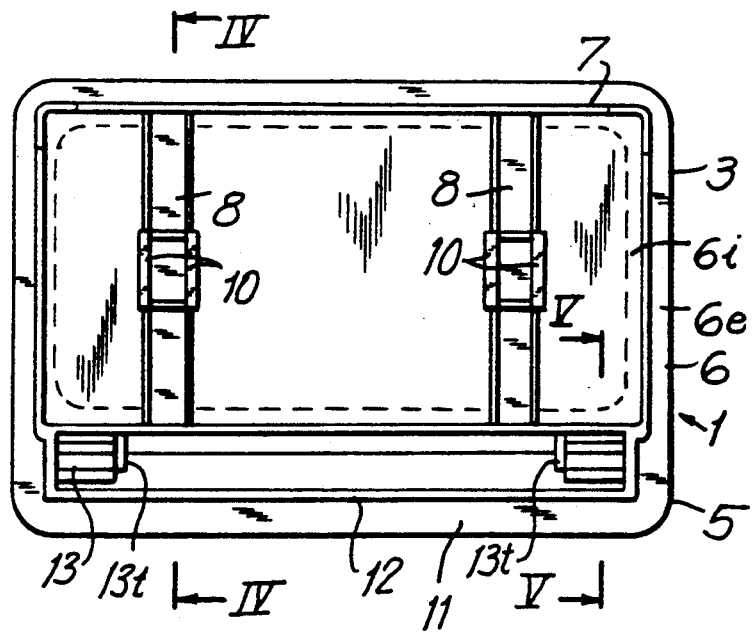
FIG. 3 is a rear view of the one-piece frame of the mirror of the invention.

FIGS. 1 and 3 show two spaced struts 8 extending between the two longer sides of the frame 3. These struts 8 act as a structural reinforcement for the one-piece frame 1. There are also retaining means for the plate 4 containing the reflective surface of the mirror, and means for anchoring the one-piece frame 1 in the sun visor structure (not shown in the accompanying drawing sheets).

Figure 4:
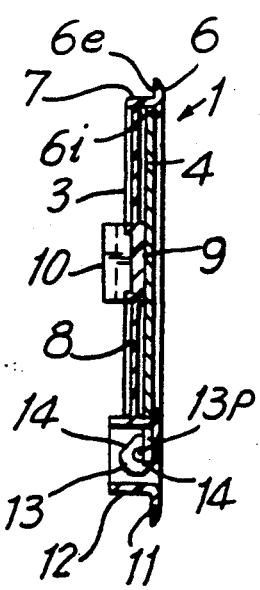
FIG. 4 is a view showing a section taken along the line IV—IV of FIG. 3.
Figure 5:
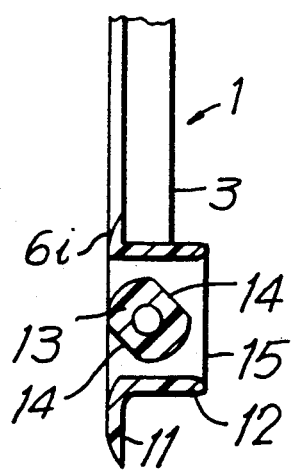
FIG. 5 is a detail view, partly in section, of the one-piece frame.

It can be seen in FIGS. 2 and 4 of the that both struts 8 are provided in the middle of the front face, in the normal position of use, with respective areas 9 of reliefs for retaining the plate 4. These reliefs prevent any movement or vibration of the plate 4 once mounted in the one-piece frame 1. It can also be seen in FIGS. 2 and 4 that the struts 8 are provided in the middle on the rear surface, in the normal position of use, with respective retaining tabs 10 for anchoring the one-piece frame 1 in the sun visor structure.

FIGS. 3 and 4 show in detail the U-shaped extension 5 in which the means for retaining and pivoting the cover 2 is formed. The extension has an outer wing hinged 11 and a rib 12 perpendicular to the plane of the outer wing 11, acting as a structural reinforcement member.

The outer flange 6e and outer wing 11 are designed to cover the perimeter of the opening allowing the assembly of the mirror of the invention in the sun visor over a sufficient distance. They conceal the perimeter which may be produced by machining and usually has an irregular profile.

The means for retaining and pivoting the hinged cover 2, as shown in FIGS. 1, 2, 3, 4 and 8 include two projections 13. They are located respectively on the facing surfaces of the U-shaped extension 5 of the one-piece frame 1 and extend perpendicularly to the facing surfaces, with the respective axes thereof aligned. The projections 13 have planes 14 defining the concealment position of the reflective surface by the hinged cover 2.

Figure 8:
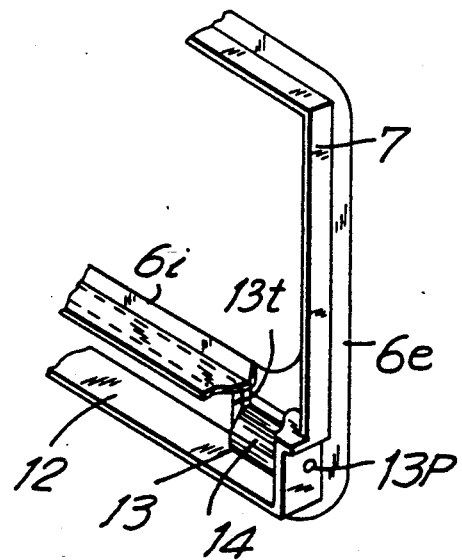
FIG. 8 is a perspective detail of the one-piece frame of the mirror of the invention.

To increase the strength of the projections 13 against the mechanical loads the hinged cover 2, when operated by user two struts 13t connect the corresponding free ends of the projections 13 with the central rib 7, as shown in FIGS. 1, 3 and 8.

The through hole 13p formed in the projections 13 and shown in FIGS. 2, 4, 5 and 8 is merely a result of the manufacturing process of the one-piece frame 1 and has no operative function with regard to the invention.

Figure 6:
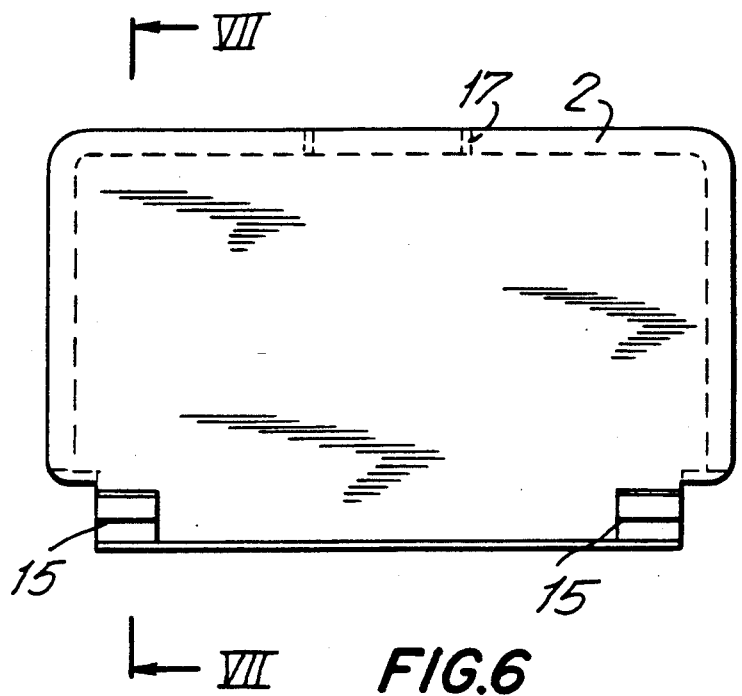
FIG. 6 is a rear view of the cover of the mirror of the invention.
Figure 7:
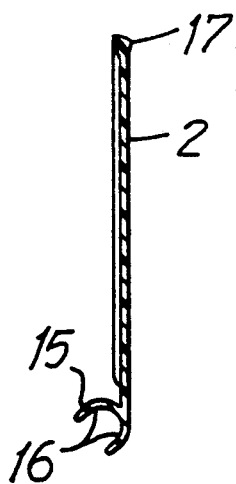
FIG. 7 is a view showing a section taken along line VII—VII of FIG. 6.

FIGS. 6 and 7 show in detail the hinged cover 2. It has an essentially rectangular shape and corresponds, in this embodiment to the maximum dimensions of the frame 3.

U-shaped clamps 15 are formed at respective ends of one of the longer sides of the hinged cover 2. The U-shaped clamps 15, as shown in FIG. 7, extend generally obliquely relative to the transverse axis of the hinged cover 2. Both clamps 15 are provided with an inner contour or cross section snugly mating with the respective contour of the projections 13 formed on the inner surfaces of the U-shaped extension 5 of the one-piece frame 1.

It is extremely simple to mount the hinged cover 2 in the one-piece frame 1 with no tools being required. It suffices to face up the clamps 15 and the projections 13 and press the latter into the clamps 15, so that the one-piece frame 1 and the hinged cover 2 are firmly connected.

Once the hinged cover 2 is coupled to the one-piece frame 1, the user may define set positions of use of the hinged cover 2 over a wide range, between the position of concealment of the reflective surface of the mirror and the position of use under normal conditions of the reflective surface.

FIG. 2 shows the hinged cover 2 in the concealment position of the mirror reflective surface. In this position the joint action of the planes 14 defining this concealment position and formed on the projections 13, and the mating planes 16 formed on the clamps 15 of the hinged cover 2, prevents the hinged cover 2 from coming out of said position during use as a result of wear or vibration of the vehicle when running.

To facilitate the operation of the hinged cover 2 when it is coupled to the one-piece frame 1, the cover 2 is provided with a projection 17 of a hinged sufficient size shown in FIGS. 2, 6 and 7.

What is claimed is:

1. A mirror for a motor vehicle sun visor, comprising a reflective member having a reflective surface; a frame having a frame portion for said reflective member and a U-shaped extension extending substantially perpendicularly to a longitudinal axis of said frame portion; a hinged cover for concealing said reflective surface of said reflective member; at least one struts connected with said frame portion and having a relief for retaining said reflective surface member; and means for retaining and pivoting said hinged cover, provided in said extension.

2. A mirror as defined in claim 1, wherein said frame portion has an external covering flap including an inner flange, an outer flange, and a central rib extending substantially perpendicularly to said flange.

3. A mirror as defined in claim 1, wherein said strut has an opposite end provided with a retaining tab for engaging in a sun visor body.

4. A mirror as defined in claim 1, wherein said frame portion has two longer sides, said strut extending between said longer sides of said frame portion.

5. A mirror as defined in claim 1, and further comprising a second such strut, said struts being spaced from one another in a longitudinal direction of said frame portion.

6. A mirror as defined in claim 1, wherein said U-shaped extension has a length corresponding to a length of said frame portion.

7. A mirror as defined in claim 1, wherein said U-shaped extension has an external flap with an outwardly oriented flange and a rib extending perpendicularly to a plane of said external flap.

8. A mirror as defined in claim 1, wherein said frame is formed as a one-piece substantially rectangular frame.

9. A mirror as defined in claim 1, wherein said hinged cover has an operating projection adapted to be grasped by a user for pivoting said hinged cover.

10. A mirror for a motor vehicle sun visor, comprising a reflective member having a reflective surface; a frame having a frame portion for said reflective member and a U-shaped extension extending substantially perpendicularly to a longitudinal axis of said frame portion; a hinged cover for concealing said reflective surface of said hinged cover provided in said extension, and wherein said U-shaped extension has inner facing surfaces, said retaining and pivoting means including two projections extending from said facing surfaces and having longitudinal axes aligned with one another.

11. A mirror as defined in claim 10, wherein each of said projections has a plurality of planes for providing a position of concealment of said reflective surface by said hinged cover.

12. A mirror as defined in claim 10; and further comprising means for coupling said hinged cover with said frame and including U-shaped clamps extending substantially obliquely from said hinged cover and having an external contour corresponding to a contour of said projections, so that when said clamps and said projections engage with each other said hinged cover can pivot and occupy a plurality of positions.

13. A mirror as defined in claim 12, wherein each of said projections has a plurality of planes for providing a position of concealment of said reflective surface by said hinged cover, said clamps of said cover and said planes of said projections being formed so as to prevent said cover from coming out of its concealing position.

14. A mirror for a motor vehicle sun visor, comprising a reflective member having a reflective surface; a frame having a frame portion for said reflective member and a U-shaped extension extending substantially perpendicularly to a longitudinal axis of said frame portion; a hinged cover for concealing said reflective surface of said reflective member, said hinged cover being formed as a substantially rectangular one-piece member provided with means for coupling said cover to said frame and with means for facilitating operation of said cover when said cover is coupled to said frame; and means for retaining and pivoting said hinged cover, provided in said extension.

15. A mirror for a motor vehicle sun visor, comprising a reflective member having a reflective surface; a frame having a frame portion for said reflective member and a U-shaped extension having inner facing surfaces and extending substantially perpendicularly to a longitudinal axis of said frame portion; a hinged cover for concealing said reflective surface of said reflective member; means for retaining and pivoting means being provided in said U-shaped extension and including two projections extending from said inner facing surfaces, said projections having longitudinal axes aligned with one another; and means for coupling said hinged cover with said frame, said means for coupling including U-shaped clamps extending substantially obliquely from said hinged cover and having an external contour corresponding to a contour of said projections, so that when said clamps and said projections engage with each other said hinged cover can pivot and occupy a plurality of positions.

* * * * *